US008942834B2

(12) United States Patent
Johnston et al.

(10) Patent No.: US 8,942,834 B2
(45) Date of Patent: Jan. 27, 2015

(54) METHOD AND APPARATUS FOR COMMUNICATING TRANSACTIONS BETWEEN AN INDUSTRIAL CONTROLLER AND A PROGRAMMING INTERFACE

(75) Inventors: David A. Johnston, Mentor, OH (US); Jacob S. Baker, Rocky River, OH (US); Luis A. Capriles, Mentor, OH (US); Raymond R. Husted, Middlefield, OH (US); Scott A. Pierce, Concord Township, OH (US); Douglas W. Reid, Mentor, OH (US); Robert R. Sepsi, Richmond Heights, OH (US); Douglas B. Sumerauer, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 607 days.

(21) Appl. No.: 11/167,381

(22) Filed: Jun. 27, 2005

(65) Prior Publication Data

US 2006/0294047 A1     Dec. 28, 2006

(51) Int. Cl.
*G06F 9/46* (2006.01)
*G05B 19/042* (2006.01)
*G06F 11/14* (2006.01)
*G06F 11/20* (2006.01)
*G06F 9/30* (2006.01)

(52) U.S. Cl.
CPC .......... *G06F 9/466* (2013.01); *G05B 19/0426* (2013.01); *G05B 2219/23255* (2013.01); *G05B 2219/23302* (2013.01); *G05B 2219/23335* (2013.01); *G05B 2219/24139* (2013.01); *G06F 11/1474* (2013.01); *G06F 11/2038* (2013.01); *G06F 9/3004* (2013.01); *G06F 9/30087* (2013.01); *Y10S 707/955* (2013.01)
USPC .............. 700/87; 700/18; 717/100; 707/955

(58) Field of Classification Search
USPC .......... 707/955; 717/100, 101, 108, 110, 116, 717/120–127, 131, 136, 168–178; 700/18, 700/47, 86–87, 181, 246, 253
See application file for complete search history.

(56) References Cited

U.S. PATENT DOCUMENTS

| 5,781,776 | A | * | 7/1998 | Johnston et al. | ............... 717/130 |
| 5,943,675 | A |   | 8/1999 | Keith et al. |   |
| 5,950,006 | A | * | 9/1999 | Crater et al. | ............... 717/140 |

(Continued)

FOREIGN PATENT DOCUMENTS

| EP | WO 00/70417 | 11/2000 |
| EP | WO 01/31458 A1 | 5/2001 |

(Continued)

OTHER PUBLICATIONS

European Search Report, EP 1 742 125 A3, Feb. 1, 2008, 3 pages.

*Primary Examiner* — Dinku Gebresenbet
(74) *Attorney, Agent, or Firm* — Boyle Fredrickson, S.C.

(57) ABSTRACT

An industrial control system includes an industrial controller and a programming interface. The programming interface is operable to communicate a plurality of operations for modifying a control program maintained by the industrial controller followed by a commit transaction command. The industrial controller is configured to designate the plurality of operations with a pending status and preprocess the plurality of operations. The industrial controller is further configured to commit the operations and clear the pending status responsive to receiving the commit transaction command.

26 Claims, 8 Drawing Sheets

(56) References Cited

U.S. PATENT DOCUMENTS

| | | | |
|---|---|---|---|
| 5,963,448 A * | 10/1999 | Flood et al. .................... 700/82 |
| 5,997,166 A * | 12/1999 | Flood ............................. 700/2 |
| 6,088,624 A | 7/2000 | Khan et al. |
| 6,199,055 B1 * | 3/2001 | Kara et al. ................... 705/405 |
| 6,263,487 B1 | 7/2001 | Stripf et al. |
| 6,487,455 B1 | 11/2002 | Balasubramanian |
| 6,535,926 B1 | 3/2003 | Esker |
| 6,631,476 B1 | 10/2003 | Vandesteeg et al. |
| 6,675,226 B1 | 1/2004 | Nair et al. |
| 6,687,257 B1 | 2/2004 | Balasubramanian |
| 6,701,198 B1 | 3/2004 | Vandesteeg et al. |
| 6,721,900 B1 | 4/2004 | Lenner et al. |
| 6,801,813 B2 | 10/2004 | Kay et al. |
| 6,819,960 B1 | 11/2004 | McKelvey et al. |
| 6,822,346 B2 | 11/2004 | Floro et al. |
| 2003/0014322 A1 * | 1/2003 | Kreidler et al. ................ 705/26 |
| 2003/0023336 A1 * | 1/2003 | Kreidler et al. ............... 700/108 |
| 2003/0051203 A1 | 3/2003 | Vasko et al. |
| 2004/0068516 A1 * | 4/2004 | Lee et al. ................... 707/103 Y |
| 2005/0066320 A1 * | 3/2005 | Petig et al. .................. 717/146 |
| 2005/0144301 A1 * | 6/2005 | Park et al. .................... 709/230 |
| 2006/0206866 A1 * | 9/2006 | Eldrige et al. ................ 717/122 |

FOREIGN PATENT DOCUMENTS

| | | |
|---|---|---|
| EP | 1 276 116 A1 | 1/2003 |
| EP | 276 116 A1 | 10/2003 |
| WO | WO 00/70417 | 11/2000 |
| WO | WO 01/31458 A1 | 5/2001 |

* cited by examiner 160 164 166 168

| ID | Name | Status |
|---|---|---|
| 001 | DataTypeA | Pending Create |
| 002 | DataTableB | Pending Create |
| 003 | SymbolC | Pending Create |
| 004 | IOMapD | Pending Create |
| 005 | IOConE | Pending Create |

| ID | Name | Status |
|---|---|---|
| 001 | DataTypeA | Active |
| 002 | DataTableB | Active |
| 003 | SymbolC | Active |
| 004 | IOMapD | Active |
| 005 | IOConE | Active |

METHOD AND APPARATUS FOR COMMUNICATING TRANSACTIONS BETWEEN AN INDUSTRIAL CONTROLLER AND A PROGRAMMING INTERFACE

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates to industrial control systems and, in particular, to a method and apparatus for communicating transactions between an industrial controller and a programming interface.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Industrial controllers are special purpose computers used for controlling industrial processes or manufacturing equipment. Under the direction of a stored program, the industrial controller examines a series of inputs reflecting the status of the controlled process and changes outputs affecting the control of the process. The inputs and outputs are most simply binary, that is "on" or "off", however analog inputs and outputs taking on a continuous range of values are also used. The binary inputs and outputs may be represented by single bits of data, the analog inputs and outputs may be represented by multiple bit data words.

The various components of an industrial controller are often spatially distributed about a factory or manufacturing facility to be interconnected by one or more communication networks. These communication networks are characterized by being highly reliable and by delivering data with a minimal and well defined delay, as is required for real-time control. A number of different communication networks are commonly used in the industrial controller art including but not limited to: ControlNet; DeviceNet and EtherNet whose specifications are published and whose protocols are used broadly by a number of manufacturers and suppliers. These communication networks differ from one another in physical aspects, for example, the type of media (e.g., co-axial cable, twisted pair, light fiber, etc.); the protocols of its operation, (e.g., Baud rate, number of channels, word transmission size, use of connected messaging, etc.) and how the data is formatted and how it is collected into standard messages.

A common component of the industrial controller is an input or output (I/O) module which accepts data for a central control computer from the controlled process or machine, and provides data from the central control computer to the controlled process or machine. I/O modules are typically remote from the central control computer and connected via a communications network as described above.

In some applications, I/O modules may be added while the industrial controller is actively controlling a process. The nature of the process may be such that interrupting the process to reprogram the controller would cause costly downtime or product defects. To configure the industrial controller to recognize the added I/O module, the control programs stored in the controller are modified to create various data objects and communication links.

In some industrial control systems, a workstation computer executes a software application to provide a programming interface for accessing and modifying the control program of the industrial controller to implement programming changes such as adding an I/O module, for example. To implement the desired change, a series of discrete commands are communicated from the workstation software to the controller to establish the required entities. In some cases, a power cycling event or the loss of the communication link between the workstation and the controller may disrupt the series of commands midstream. The series may also be disrupted if the controller cannot process one of the commands, for example due to the state of an object being modified or a lack of memory space for an object being added.

In cases where the series of commands is interrupted or fails, it is difficult to clean up the partially completed process for instantiating the added module or program change. It may not be feasible to shut down the process to allow the last known good image to be reloaded onto the controller. Hence, the clean up may need to be performed manually, which is time-consuming, potentially expensive, and imprecise. For example, all of the objects created in the controller may not be properly removed during the clean up process. These artifacts may lead to wasted storage space or even system instability.

The present invention is directed to overcoming, or at least reducing the effects of, one or more of the problems set forth above.

BRIEF SUMMARY OF THE INVENTION

The present inventors have recognized that a transaction process may be employed by the programming interface that communicates with an industrial controller. The transaction includes a plurality of operations followed by a commit transaction command. The industrial controller preprocesses the operations, but designates them as being in a pending state. Only after receiving the commit transaction command, does the industrial controller remove the pending status and commit the operations. In this manner, if the transaction is aborted prior to the exchange of the commit transaction command, the pending operations may be readily reversed.

One aspect of the present invention is seen in an industrial control system including an industrial controller and a programming interface. The industrial controller maintains a control program for interfacing with a controlled process. The programming interface is operable to communicate a transaction to the industrial controller. The transaction includes a plurality of operations for modifying the control program followed by a commit transaction command. The industrial controller is operable to preprocess the plurality of operations, designate the plurality of operations with a pending status, and commit the operations and clear the pending status responsive to receiving the commit transaction command.

Another aspect of the present invention is seen in an industrial controller including a memory and a processing device. The memory is operable to store an object-oriented application for interfacing with a controlled process. The processing device is operable to receive a transaction. The transaction includes a plurality of operations affecting the object-oriented application, followed by a commit transaction command. The processing device is operable to preprocess the plurality of operations, designate objects in the object-oriented application associated with the operations as having a pending status, and commit the operations and clear the pending status responsive to receiving the commit transaction command.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and:

FIGS. 7A and 7B are table illustrating the status of objects during the transaction of FIG. 6;

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
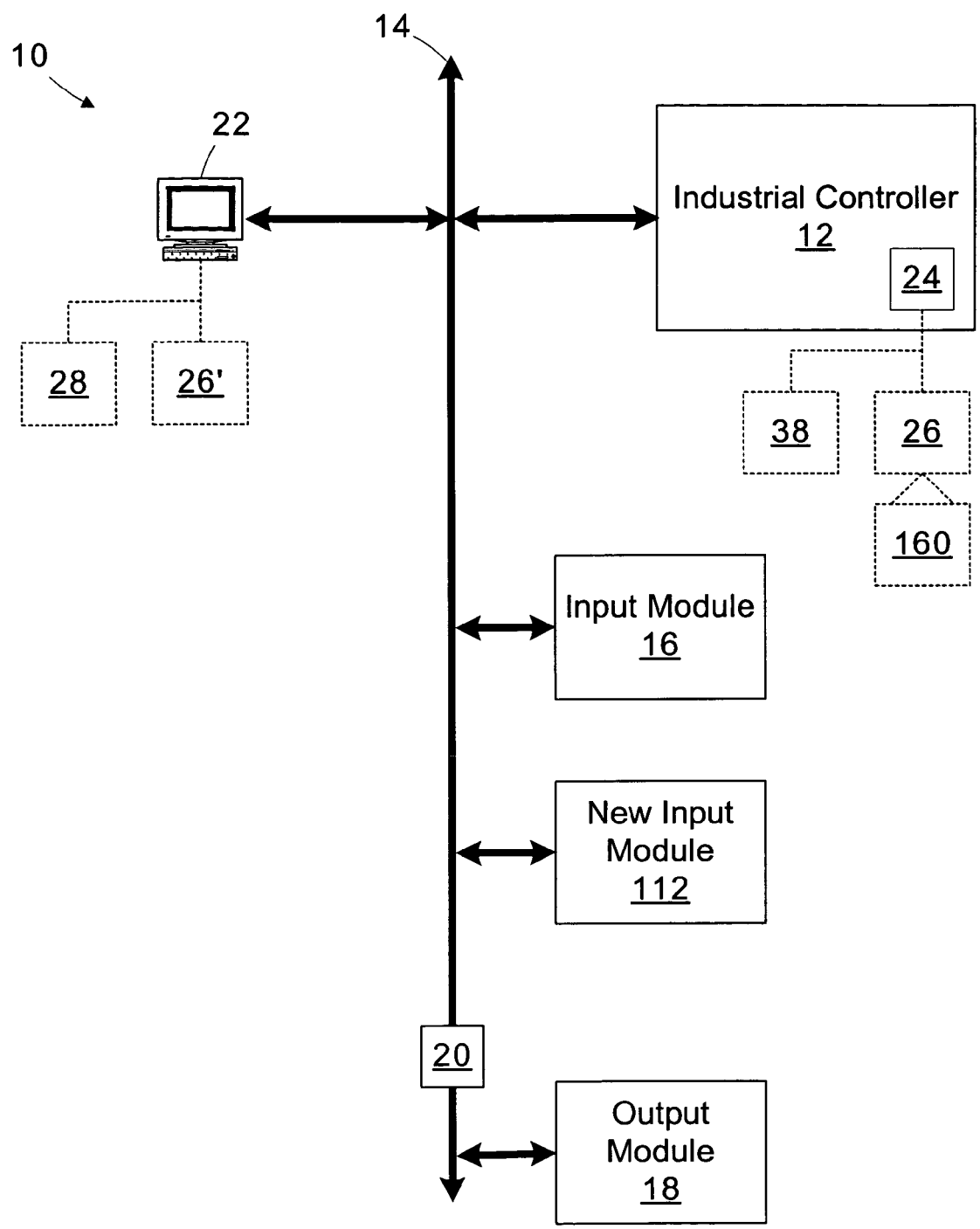
FIG. 1 is a simplified diagram of an industrial control system in accordance with one embodiment of the present invention.

Referring now to the drawings wherein like reference numbers correspond to similar components throughout the several views and, specifically, referring to FIG. 1, the present invention shall be described in the context of an industrial control system 10. The industrial control system 10 includes an industrial controller 12 communicating on a network 14 with a remote input module 16 and a remote output module 18. The network 14 may be a standard and commonly available high-speed serial network including but not limited to: Ethernet, DeviceNet, ControlNet, Firewire or FieldBus. The network 14 may optionally include a bridge 20 translating between different of the above standard or other protocols. Generally, the input module 16 may accept input signals associated with a controlled process (e.g., from a sensor) which are communicated over the network 14 to the industrial controller 12. At the industrial controller 12 the input signals may be processed under a control program and further signals sent to the output module 18 which may produce output signals to a device associated with the controlled process (e.g., actuator, relay, solenoid, motor, enunciator, lamp, etc.). The particular process being controlled, and specific input and output module types are not material to the present invention. The I/O modules 16, 18 may be integrated with the industrial controller 12 or remote from the industrial controller 12. Additional I/O modules 16, 18 may be added without interrupting the control of the process by the industrial controller 12. The industrial control system 10 may be implemented using Logix™ components offered by Rockwell Automation, Inc. of Milwaukee, Wis.

A workstation 22 is provided for interfacing with the industrial controller 12. The workstation 22 implements a transaction technique where operations performed by the workstation 22 for changing objects in the industrial controller 12 are grouped into a single transaction that is not acted upon until a commit signal issued by the workstation 22 is received by the industrial controller 12. Transactions interrupted or aborted prior to receiving the commit signal may be rolled back, leaving the industrial controller 12 in its original state. The workstation 22 may communicate with the industrial controller 12 to modify aspects of the controller's operation, such as the control program. The workstation 22 may also communicate with the industrial controller 12 to configure and enable additional I/O functionality. From the standpoint of the user, a transaction is an atomic event, in that it entirely succeeds or is aborted.

In the illustrated embodiment, the industrial controller 12 is programmed using an object-oriented programming language. The workstation 22 may interface with the industrial controller 12 to modify, add, or delete various objects stored in a memory 24 of the industrial controller 12 and used to implement its functionality. In particular, the objects may include I/O objects needed to implement the functions of the hardware of the I/O modules 16, 18. Exemplary objects include symbols, data tables, templates, I/O maps, and I/O connections. Collectively, the objects maintained in the memory 24 to implement the functionality of the industrial controller 12 may be referred to as the control program of the industrial controller. Hence, the workstation 22 provides a programming interface for updating the control program of the industrial controller 12. An exemplary framework for communicating between the workstation 22 and the industrial controller 12 for programming the industrial controller 12 is described in U.S. Pat. No. 6,819,960, entitled "Industrial Controller Automation Interface," subject to assignment to the assignee of the present application, and incorporated herein by reference in its entirety.

As shown in FIG. 1, within its memory 24, the industrial controller 12 maintains an object database 26. In general the object database 26 lists the states of the various control program objects used by the industrial controller 12. The format employed by the industrial controller 12 for indexing objects may vary.

The workstation 22 of FIG. 1 executes a programming interface 28 (i.e., software application) through which a user may interface with and program the industrial controller 12. The programming interface 28 programs the industrial controller 12 using transactions. Each transaction includes a plurality of operations, which are operated on by the industrial controller 12, but kept in a pending state until the transaction is committed. The programming interface 28 maintains a synchronized copy of the object database 26'.

In general, transactions may include a series of operations for performing tasks necessary to instantiate I/O objects, such as creating a tag, creating a DataType, or creating a module. Creating a tag includes creating several objects, such as Symbol, Data, Message, Axis, MotionGroup, Coordinate System, and Connections. Creating a DataType requires the creation of an empty DataType offline, adding the members of the DataType, and then creating the DataType online. Creating a module requires creating a MapDevice and setting its properties. I/O tags, connections, and possibly DataTypes may also need to be created. For purposes of illustration, the following example relates to creating a module using a transaction communicated between the programming interface 28 and the industrial controller 12.

Figure 2:
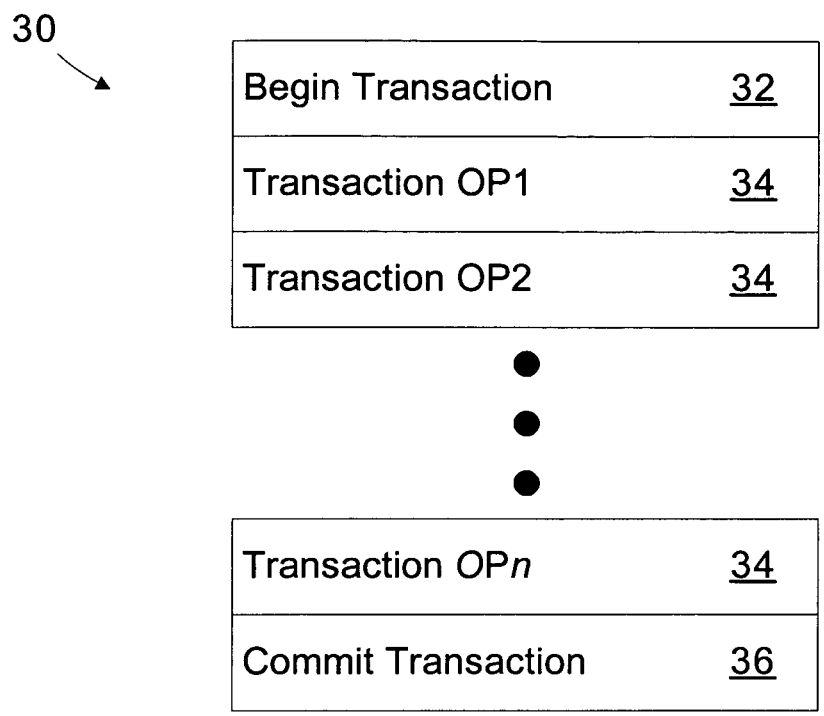
FIG. 2 is a diagram illustrating a transaction employed in the system of FIG. 1.

Turning to FIG. 2, a diagram illustrating the components of an exemplary transaction 30 is provided. The transaction 30 includes a begin transaction command 32 followed by one or more operation commands 34. A commit transaction command 36 indicates the end of the transaction 30.

The programming interface 28 sends the transaction 30, one operation command 34 at a time, and the industrial controller 12 preprocesses each operation 34 in turn, but keeps the objects of the operation commands 34 in a pending state. Preprocessing may involve checking the syntax of the operation, reserving memory, checking the state of an existing object, instantiating a pending object, etc. For example, a new object may have a state of "Pending Create," a modified object may have a state of "Pending Modify," and an object to be deleted may have a state of "Pending Delete."

Memory is reserved for the objects as their associated operation commands 34 are received and preprocessed. In the case where an object is to be modified or deleted, the industrial controller 12 ensures that the requested operation can be performed (i.e., the referenced object exists and is in a state where modification is allowed), but the actual completion of the action is deferred. The values for a pending modify object remain unmodified and the actual change values are cached so that they can be applied during the commit. For a DataTable object, only the exact bits and bytes that were changed will be written on commit, so that changes to unaffected bytes that are changed by the running process will be preserved. Operation commands 34 that modify pending new objects need not be deferred as they do not affect a current object. After receiving the commit transaction command 36 from the programming interface 28, the industrial controller 12 changes the pending status of the objects of the operation commands 34 and completes any deferred actions.

If an error occurs between the begin transaction command 32 and the commit transaction command 36, the transaction 30 is aborted, and the objects having pending states are returned to their original states. For example, Pending Create objects are deleted, and Pending Delete or Modify objects are left unchanged. The process of canceling the pending operations is referred to as "rolling back" the transaction 30.

Situations that may give rise to a transaction 30 being aborted and the operation commands 34 being rolled back include, a loss of power, a loss of communication between the industrial controller 12 and the workstation 22 over the network 14, or the failure of one of the operation commands 34 to preprocess. For example, if a particular operation command 34 requests the creation of an object, but the industrial controller 12 has insufficient space in its memory 24, the industrial controller 12 will report the failure of the operation command 34 to the programming interface 28. Similarly, if a particular operation command 34 attempts to modify a non-existent or locked object, it fails. The industrial controller 12 and the workstation 22 may have error handling routines that trigger the abort due to a failure of an operation command 34 to preprocess. The industrial controller 12 and/or the workstation 22 may also have internal monitoring functionality for identifying a loss of communication (e.g., heartbeat or timeout circuitry) and initiating the abort. If a loss of power occurs between the begin transaction command 32 and the commit transaction command 36, the industrial controller 12 identifies objects with pending states and aborts the transaction 30 upon power up. Other failure events may be specified, depending on the particular implementation and the operation command 34 being performed.

Assuming the operation commands 34 preprocess properly, the industrial controller 12 commits the changes in response to receiving the commit transaction command 36. Committing the operations involves actual instantiation of the objects by marking them as no longer being pending or completion of deferred operations, such as deletes or modifies. The industrial controller 12 may indicate the completion of the transaction 30 as part of the exchange of the commit transaction command 36, or alternatively, the programming interface 28 may periodically poll the industrial controller 12 after it sends the commit transaction command 36 to determine if the industrial controller 12 has successfully committed the transaction 30. If a communication loss occurs after the commit transaction command 36 has been sent to the industrial controller 12, the programming interface 28 may abort the transaction, however, the industrial controller 12 does not abort a transaction once the commit transaction command 36 has been received.

The programming interface 28 responds to an aborted transaction by returning the objects in its object database 26' to their original states. One technique for rolling back the object database 26' involves employing the rollback functionality of the c-Tree® database package offered by FairCom Corp. of Columbia, Mo., which may be used by the workstation 22. Prior to initiating the transaction 30, the programming interface 28 marks a rollback point in the object database 26', and then makes changes to the records as its sends the operation commands 34 to the industrial controller 12. At any point, the changes can either be committed, in which case they become permanent, or they can be rolled back to the rollback point. By enabling transactioning for all of the database tables (e.g., Components, Regions, Nameless, Comments, and Cross-Reference) all of the changes can be rolled back.

Another technique for aborting the transaction 30 includes simply closing the programming interface 28 without saving the changes to the object database 26'. When the programming interface 28 is executed at a later point, it will re-synchronize its object database 26' with the object database 26 used by the industrial controller 12 thereby recognizing the completion of the transaction 30.

Returning to FIG. 1, the industrial controller 12 also maintains a change log 38 containing a history of changes made to the object database 26. The industrial controller 12 does not update the change log 38 until after the transaction 30 has been committed. In some embodiments, the change log 38 may include an entry for the begin command of a transaction that includes a unique transaction ID, but the actual operation commands 34 are not included until after the transaction 30 has been committed. If the programming interface 28 does not recognize the successful commit of the transaction 30, it may resynchronize its object database 26' by looking at the history in the change log 38 since its last update. For complete transactions 30, the change log 38 stores a unique transaction ID (e.g., within the begin transaction command 32 and the commit transaction command 36. The programming interface 28 recognizes those transactions it has originated and disregards them when updating using the change log 38. During a transaction it is initiating, the programming interface 28 only keeps track of the begin entry, with its transaction ID. When the programming interface 28 reads the change log 38 and encounters a begin transaction command 32 with that ID, it begins ignoring change log entries until it encounters a commit transaction command 36 with the same ID. The interactions between the workstation 22 and the change log 38 are described further in U.S. Pat. No. 5,943,675, entitled "Change Log Historian System for Memory Shared by Multiple Workstations," subject to assignment to the assignee of the present application, and incorporated herein by reference in its entirety.

Figure 3:
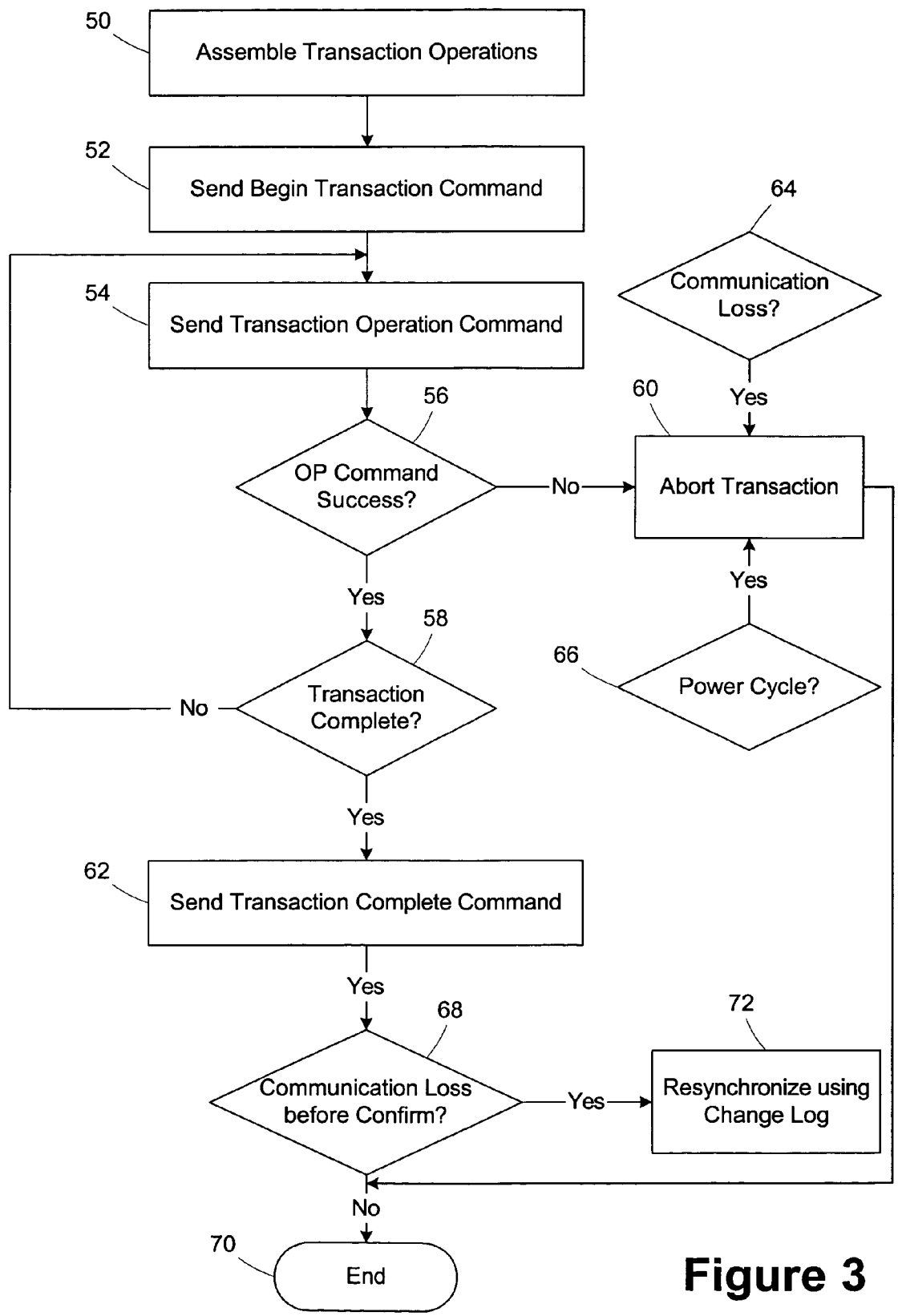
FIG. 3 is a simplified flow diagram of processing performed by a programming interface in the system if FIG. 1 to implement a transaction.

Turning now to FIG. 3 (and still referencing FIG. 2), a simplified flow diagram of the process performed by the programming interface 28 during a transaction 30 is provided. In block 50, the programming interface 28 assembles the operations needed to implement the transaction 30. In some cases, some parameters for an object need to be determined prior to starting the transaction. For example, creating a DataType requires the creation of an empty DataType offline, adding the members of the DataType, and then creating the DataType online. By adding the members offline, the proper size can be specified when the object is created.

In block 52, the programming interface 28 sends the begin transaction command 32 signaling to the industrial controller 12 that a transaction 30 is beginning. In block 54, the programming interface 28 sends the first transaction operation command 34. If the transaction operation command 34 is successful in block 56, the programming interface 28 determines if the transaction 30 is complete in block 58, and loops back to block 54 to send the next transaction operation command 34 if the transaction 30 is not complete. If the transaction operation command 34 fails (e.g., insufficient memory, object to be modified not available) in block 56, the programming interface 28 aborts the transaction 30 in block 60. The programming interface 28 may send an abort message to the industrial controller 12, or the industrial controller 12 may abort automatically based on the failed operation command 34. Blocks 64 and 66 represent a communication loss or a power cycle of the workstation 22 during the transaction 30, respectively. Processing to identify these events is performed in parallel with the processing of the transaction 30. If either event occurs, the transaction 30 is aborted in block 60.

If the transaction 30 is complete in block 58, the programming interface 28 sends a commit transaction command 36 in block 62. If the programming interface 28 confirms the completion of the transaction 30 (i.e., either during the exchange of the commit transaction command 36 or in response to a subsequent polling signal), the method terminates in block 70, thereby completing the transaction 30. If the programming interface 28 does not receive confirmation of the commit, the programming interface 28 may resynchronize with the industrial controller 12 using the change log 38, as described in the above referenced '675 patent.

Figure 4:
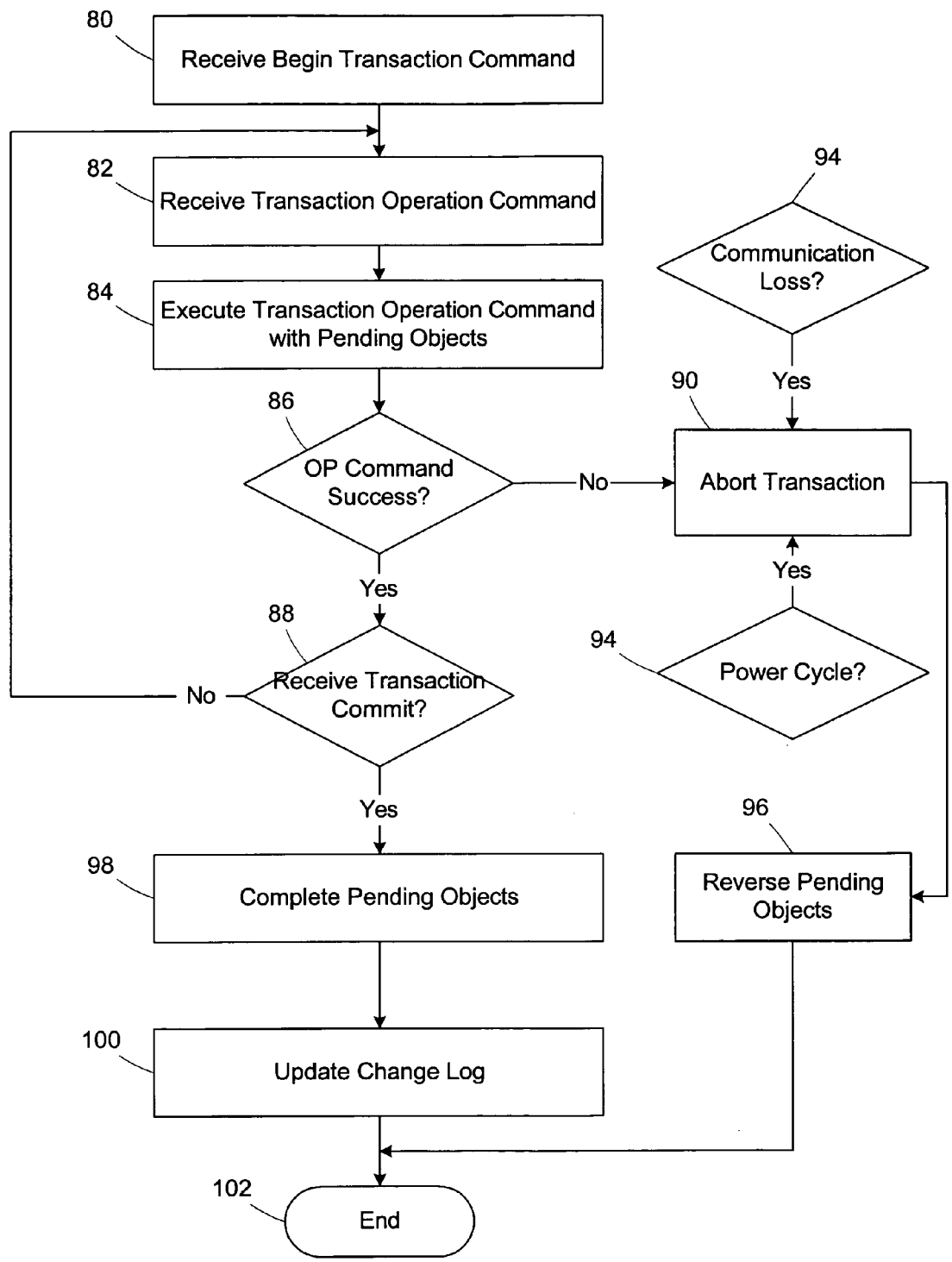
FIG. 4 is a simplified flow diagram of processing performed by an industrial controller in the system if FIG. 1 to implement a transaction.

Referring now to FIG. 4, the processing of the transaction 30, from the perspective of the industrial controller 12 is illustrated in a simplified flow diagram. In block 80, the industrial controller 12 receives a begin transaction command 32. In block 82, the industrial controller 12 receives a transaction operation command 34, and preprocesses the transaction operation command 34 in block 84. In preprocessing the transaction operation command 34, the industrial controller 12 creates pending new objects, pending delete objects, or pending modify operations for objects. If the transaction operation command 34 modifies a pending new object, the command is not deferred and completes immediately. If the transaction operation command 34 is successfully completed in block 86, the industrial controller 12 transitions to block 88 to determine if a commit transaction command 36 is received. If the next received command is not a commit transaction command 36, the industrial controller 12 returns to block 82 for the next transaction operation command 34.

If the transaction operation command 34 does not preprocess successfully in block 86, the industrial controller 12 aborts the transaction 30 in block 90, and reverses the pending objects in block 92. The actual steps performed in the abort transaction block 90 may vary depending on the particular implementation. In one embodiment, the industrial controller 12 sends an error message to the programming interface 28 in response to a failure of the command to preprocess, and the programming interface 28 sends an abort transaction message to the industrial controller 12. In another embodiment, the industrial controller 12 automatically aborts. Both of these embodiments are covered by the abort transaction block 90. A loss of communication with the programming interface 28 in block 94 or a power cycle in block 96 will also cause the industrial controller 12 to abort the transaction 30 in block 90.

In some embodiments, the industrial controller 12 and the programming interface 28 may exchange abort messages, depending on the entity identifying the abort condition and the nature of the error. In other embodiments, each may rely on their own abort management logic. For example, if an operation command 34 fails to preprocess, the industrial controller 12 reports the error. Both the industrial controller 12 and the programming interface 28 are aware of the error and automatically abort. No separate abort message is necessary. For a communication loss, a separate abort message is not necessary, as there would be no link for communicating the message. An abort message may be used in the case where the user manually aborts the transaction 30 while it is in progress (e.g., due to an error identified in the module definition).

If the commit transaction command 36 is received in block 88, the industrial controller 12 completes the pending objects in block 98 and updates the change log 38 with the complete transaction 30 in block 100. (i.e., begin transaction command 32, all transaction operation commands 34, and commit transaction command 36). The method terminates in block 102.

Now that the operation of the programming interface 28 and the industrial controller 12 for conducting a transaction 30 have been described in general, a specific example with be provided within the context of adding a new I/O module. For example, when associating a new I/O module with the industrial controller 12, the user may provide basic information about the I/O module being added, and, in a manner unseen by the user, the programming interface 28 issues a transaction 30 including the necessary operations for establishing the I/O module and the necessary links for the industrial controller 12 to recognize the new I/O module.

Figure 5:
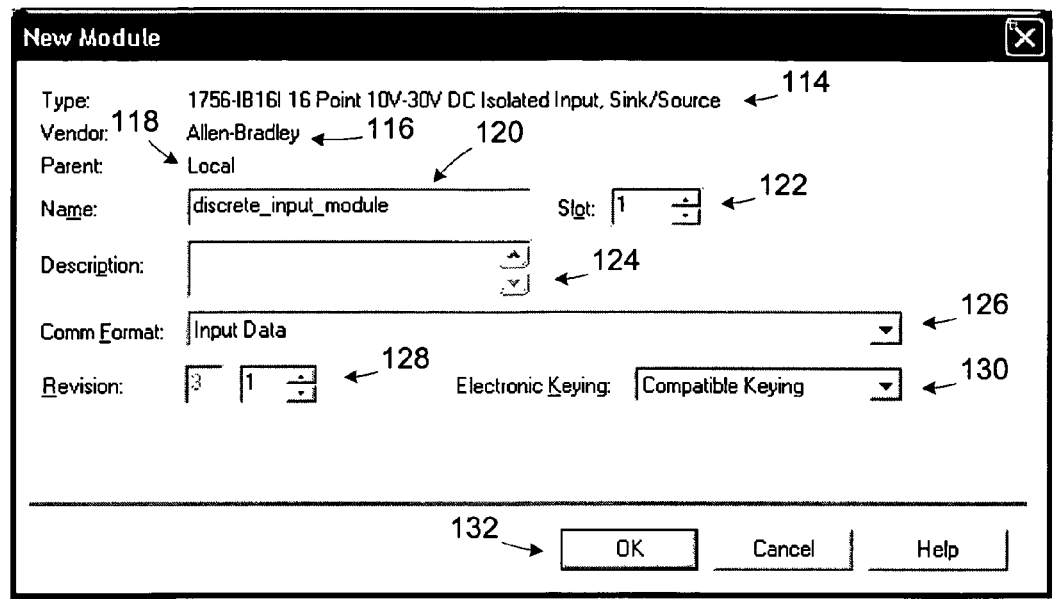
FIG. 5 is an exemplary interface screen for specifying parameters of a module being added to the system of FIG. 1.

Turning now to FIG. 5, an exemplary input screen 110 generated by the programming interface 28 for creating a module is shown. In this illustrative example, the input screen 110 relates to the addition of a new input module 112 (shown in FIG. 1). The input screen 110 includes a type field 114 indicating the type of input being added, a vendor field 116 indicating the associated vendor, and a parent field 118 indicating that the input module 110 is local. The type field 114, vendor field 116, and parent field 118 may be populated using a prior input screen (not shown) that the user initiated to start the module addition process. The user provides data in a name field 120 indicating the name of the new input module 112, a slot field 122, a description field 124, a communication format field 126, one or more revision fields 128, and an electronic keying field 130. Control buttons 132 are provided for initiating the module creation ("OK"), canceling the module creation ("Cancel"), or requesting additional information ("Help").

The slot field 122 indicates the hardware slot in which the input module 112 is installed. The communication format field 126 indicates the format of the data used by the input module 112 (e.g., input data, time stamped input data, or listen only input or time stamped data formats). Electronic keying is a mechanism to determine that the physical IO module matches what the user specifies. The options for the electronic keying field 130 are "Compatible Keying", "Exact Match", or "Disable Keying".

Figure 6:
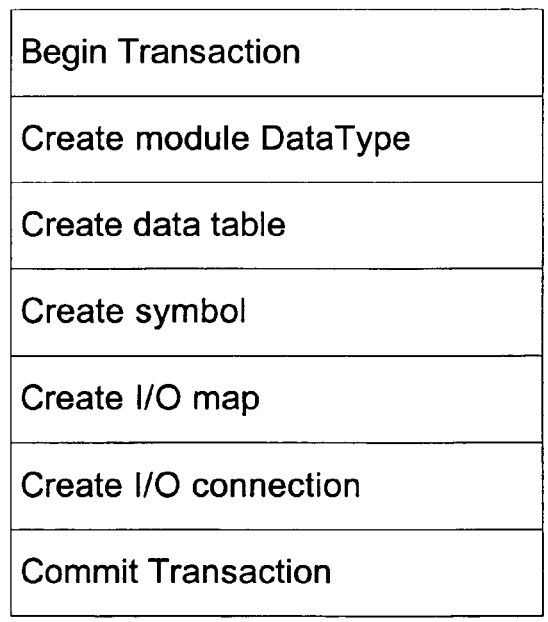
FIG. 6 is a diagram illustrating a transaction used to implement the module specified on the screen in FIG. 5.

After the user supplies the information required by the input screen 110 and selects the OK control button 130, the programming interface 28 constructs a transaction 150, shown in FIG. 6, including the operations required to allow the industrial controller 12 to recognize the input module 112. The programming interface 28 initiates the transaction 150 with a begin transaction command 32. The transaction operation commands 34 include commands for creating an appropriate DataType for the module, creating a data table for storing the data generated by the input module 110, creating a symbol, creating an I/O map, and creating an I/O connection between the input module 110 and the industrial controller 12. The programming interface 28 concludes the transaction 150 with a commit transaction command 36.

Note that the order of the operations is in a reverse pyramid order. The low level objects are created first, followed by an I/O map, and finally the I/O connection. The industrial controller 12 cannot access the input module 110 until the process completes and the final connection is made.

Turning now to FIG. 7A, a diagram of an object table 160 in the object database 26 maintained by the industrial controller 12 is provided. The object table 160 is not intended to represent the actual data structure used by the industrial controller 12, but rather just to illustrate conceptually how the industrial controller 12 may track the pending status of the objects created during the transaction 150.

Each entry 162 in the object table 160 includes an identifier field 164 a name field 166, and a status field 168. Of course, other information may be associated with the entries 30 and/or the objects they represent. For purposes of this illustration, only the objects introduced by the transaction 150 are illustrated. In an actual implementation, the object database 26 and the structure used to track the status of the objects (e.g., the object table 160) would include information about all objects maintained by the industrial controller 12. As seen in FIG. 7A, the industrial controller 12 adds objects having a "Pending Create" status responsive to processing the transaction operation commands 34 in the transaction 150.

After receiving the commit transaction command 36 from the programming interface 28, the industrial controller 12 completes the transaction 150 by changing the pending status to an "Active" status, as shown in FIG. 7B. The industrial controller 12 also updates the change log 38 with all of the commands in the transaction 150 only after committing the transaction 150.

Figure 8:
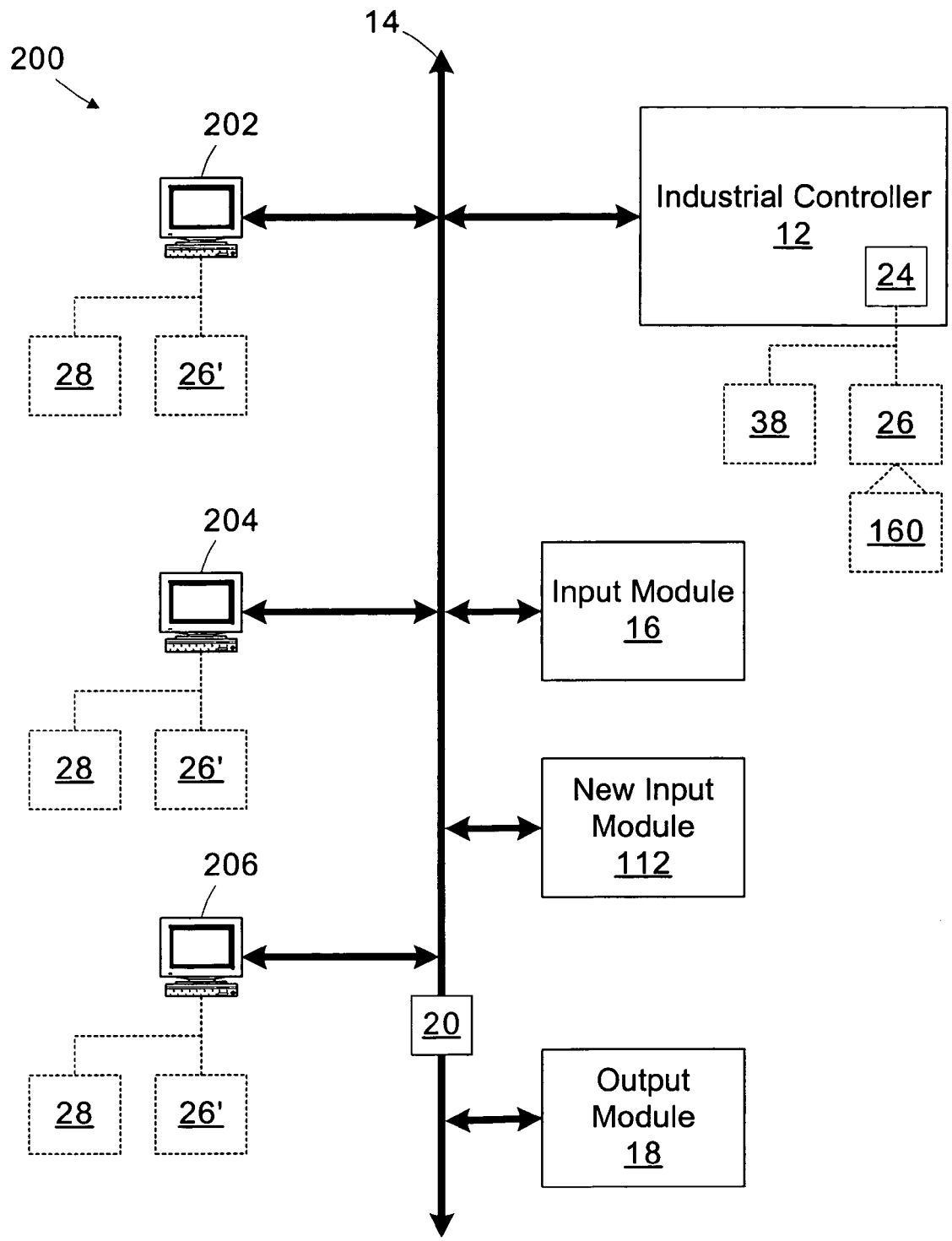
FIG. 8 is a simplified block diagram of an alternative embodiment of an industrial control system with multiple programming interfaces.

Referring now to FIG. 8, an alternative embodiment of the industrial control system 200 is illustrated where multiple workstations 202, 204, 206 are provided, each of which may access the industrial controller 12. At any point, any one of the workstations 202, 204, 206 may execute programming interfaces 28 for interfacing with the industrial controller 12 and communicating a transaction 30. During a given transaction 30, the industrial controller 12 blocks out any other workstations 202, 204, 206 but the one initiating the transaction 30 from issuing it programming commands. Other types of communication may occur with the other workstations 202, 204, 206 during a transaction 30, such as accessing the change log 38 or requesting other data.

If a particular workstation 202, 204, 206 established a new connection with the industrial controller 12 it checks the change log 38 to identify any necessary changes implemented since its last connection that need to be entered into its local copy of the object database 26'. The workstations 202, 204, 206 also poll the change log 38 periodically to identify any changes. Because, the industrial controller 12 only updates the change log 38 after the completion of the transaction 30, a workstation 202, 204, 206 other than the one issuing a transaction 30 will not see the transaction during its synchronization with the change log 38. If the transaction 30 is subsequently aborted, there other workstations 202, 204, 206 would not need to be informed of the abort, because they never would have seen the intermediate steps of the transaction 30. After a transaction 30 is committed, the industrial controller 12 updates the change log 38. Hence, the other workstations 202, 204, 206 can synchronize their object databases 26' during a subsequent connection or poll, thereby recognizing the completion of the transaction 30.

Figure 9:
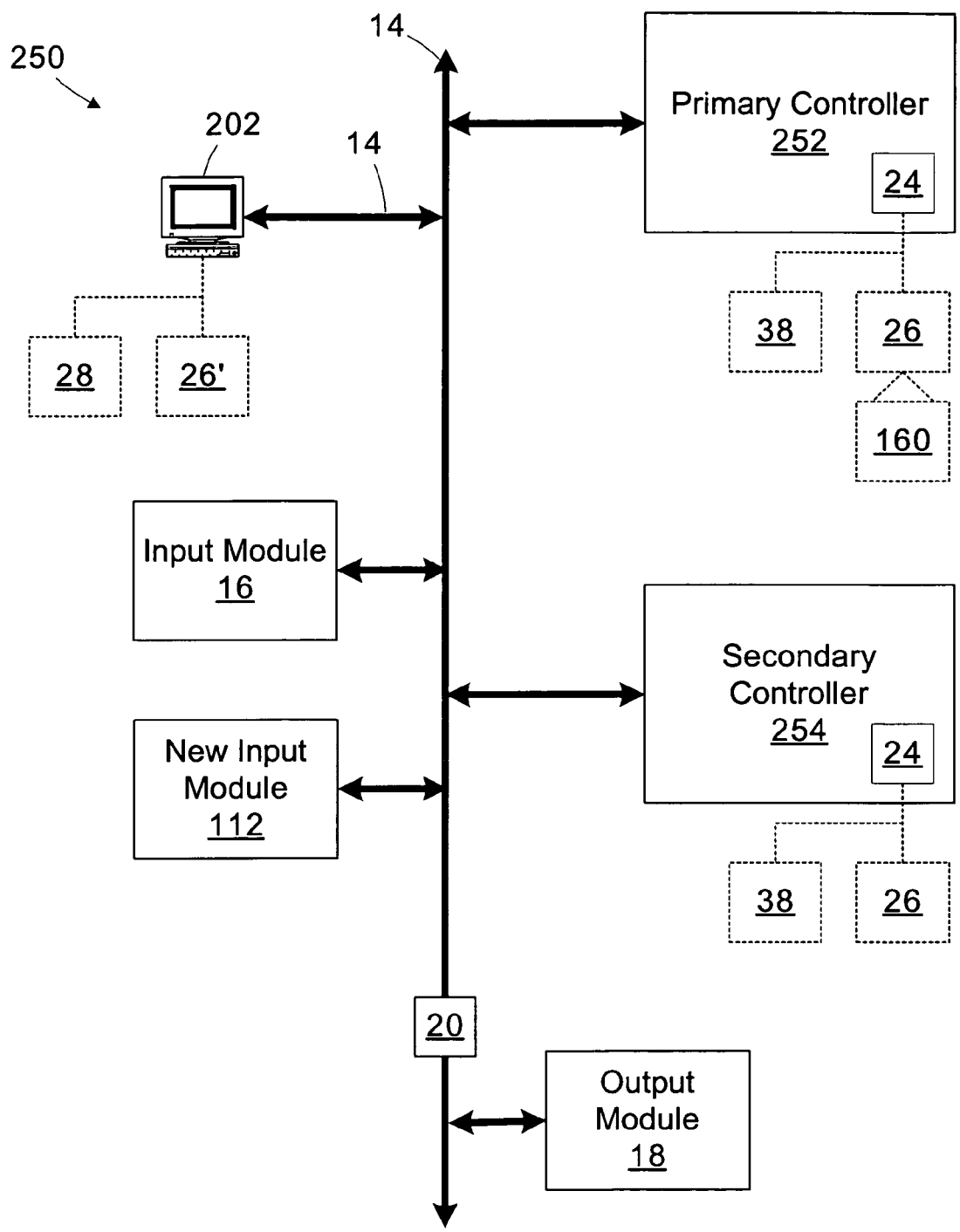
FIG. 9 is a simplified block diagram of yet another alternative embodiment of an industrial control system with redundant industrial controllers.

Turning now to FIG. 9, yet another embodiment of the industrial control system 250 is shown where multiple industrial controllers are provided, one acting as a primary controller 252, and another acting as a backup controller 254. If the primary controller 252 fails, a switchover occurs and the backup controller 254 takes over control of the process.

The workstation 22 initiates a transaction 30 with the primary controller 252, as described above. After completing the transaction 30 in response to the commit transaction command 36, the primary controller 252 communicates the transaction 30 to the backup controller 254 so that it may update its object database 26. If communication is lost during the transaction 30, and a switchover occurs, the workstation 22 and the primary controller 252 abort the transaction. The workstation 22 can initiate the transaction 30 with the backup controller 254, which now acts in a primary role, at a subsequent time.

Various techniques may be used to ensure synchronicity between the primary controller 252 and the backup controller 254. For example, the primary controller 252 may not confirm the committing of the transaction 30 until after the backup controller 254 has also made the necessary changes to its object database 26. In another example, the primary controller 252 may complete the transaction 30, update the change log 38, and then communicate the transaction 30 to the backup controller 254. If the backup controller 254 fails to complete the transaction 30, the primary controller 252 may send a message to the workstation 22 or some other entity on the network 14 indicating the fault condition with the backup controller 254.

Of course, the embodiments of FIGS. 8 and 9 may be combined where multiple workstations are present and redundant controllers are used. The transactioning process described herein reduces the likelihood that the synchronization between the entities will be compromised due to aborted transactions. From the standpoint of the user, a transaction is an atomic event, in that it entirely succeeds or is aborted. In the event of a transaction failure, it is not necessary to manually identify and remove objects that were associated with the aborted transaction.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. An industrial control system, comprising:
   an industrial controller executing an object-oriented control program to control a controlled process, wherein the control program includes a plurality of objects and wherein the industrial controller has an object table, which stores the state of each object;
   a workstation executing a programming interface for initiating a transaction, wherein the transaction includes a grouped plurality of operations, wherein each operation instantiates, deletes, or modifies at least one of the objects of the control program;
   a connection between the industrial controller and the workstation to electronically transfer the grouped plurality of operations instantiating, deleting or modifying the multiple objects of the control program from the workstation to the industrial controller followed by a commit transaction command for the group, wherein
   upon receipt of the plurality of operations from the workstation and during execution of the control program; the industrial controller, for each operation, further executes to:
   (a) without changing the control program executed by the industrial controller, preprocess each of the operations up to a point before any modification of objects that would change current execution of the control program, then cease preprocessing until the commit transaction command is received, wherein the preprocessing includes checking that the plurality of operations for the multiple objects are within the capabilities of the industrial controller, wherein checking further includes at least one of the steps of: checking the state of the existing object and instantiating a pending object,
   (b) without changing the control program executed by the industrial controller, if any of the plurality of operations is not within the capability of the industrial controller, roll back the steps of preprocessing of the operation of all of the multiple objects to return the industrial controller substantially to a state before the preprocessing of the operations;
   (c) only if each of the plurality of operations is within the capability of the industrial controller, complete processing of all of the operations upon receipt of the commit transaction command to change current execution of the control program;
   whereby partial modification of the control program objects during execution of the control program is prevented.

2. The industrial control system of claim 1, wherein a first operation comprises a command to create an object, and the industrial controller is configured to designate the created object as having a pending create status.

3. The industrial control system of claim 2, wherein a second operation comprises a command to modify the created object, wherein the industrial controller is configured to execute the second operation to modify the created object.

4. The industrial control system of claim 1, wherein a first operation comprises a command to modify an existing object, and the industrial controller is configured to designate the existing object as having a pending modify status and defer completion of the first operation.

5. The industrial control system of claim 1, wherein a first operation comprises a command to delete an existing object, and the industrial controller is configured to designate the existing object as having a pending delete status.

6. The industrial control system of claim 1, wherein the industrial controller is configured to reverse the operations having a pending status responsive to an abort of the transaction prior to receiving the commit transaction command.

7. The industrial control system of claim 6, wherein the industrial controller is configured to abort the transaction responsive to a loss of communication between the programming interface and the industrial controller.

8. The industrial control system of claim 6, wherein the industrial controller is configured to abort the transaction responsive to a failure of one of the operations to preprocess.

9. The industrial control system of claim 6, wherein the industrial controller is configured to abort the transaction responsive to a power cycling of the industrial controller prior to receiving the transaction commit signal.

10. The industrial control system of claim 1, wherein the industrial controller is configured to record the transaction in a change log responsive to committing the operations.

11. The industrial control system of claim 10, wherein, the industrial controller is configured to maintain an object database associated with objects in the control program, the programming interlace is configured to maintain a local copy of the object database, and access the change log to synchronize the local copy with the object database responsive to losing communication with the industrial controller after sending the commit transaction command, but prior to verifying the committing of the operations by the industrial controller.

12. The industrial control system of claim 10, wherein the programming interface comprises a first programming interface, the industrial control system further comprises a second programming interface, and the second programming interface is configured to access the change log to identify the transaction and update a copy of the control program based on the transaction.

13. The industrial control system of claim 1, wherein the industrial controller comprises a primary controller, the industrial control system further comprises a backup controller, and the primary controller is configured to communicate the transaction to the backup controller responsive to committing the transaction.

14. The industrial control system of claim 1, wherein the industrial controller is configured to signal the committing of the transaction to the programming interface.

15. The industrial control system of claim 1 wherein the programming interface is configured to poll the industrial controller to verify the committing of the transaction.

16. The industrial control system of claim 1 wherein at least one of the objects comprises an I/O object.

17. The industrial control system of claim 1, wherein the transaction includes a plurality of operations adding an I/O module to the control program.

18. The industrial control system of claim 1, wherein the industrial controller is configured to commit the operations without interrupting the interfacing with the controlled process.

19. The industrial control system of claim 1 wherein the current state of each object is defined at least in part as either locked or unlocked.

20. The industrial control system of claim 1, wherein the industrial controller further executes to roll hack the steps of preprocessing, to return the industrial controller substantially to a state before the preprocessing in the event of a loss of power.

21. The industrial control system of claim 1, wherein the industrial controller further executes to roll back the steps of preprocessing to return the industrial controller substantially to a state before the preprocessing in the event of a loss of communication between the industrial controller and the workstation.

22. The industrial control system of claim 1, wherein the industrial controller further executes to report a failure of an operation to preprocess to the programming interface.

23. A computer-implemented method configuring an industrial controller while executing an object-oriented control program interfacing with a controlled process, wherein the control program includes a plurality of objects, comprising:
(a) communicating a transaction to the industrial controller, the transaction including a grouped plurality of operations, each operation instantiates, deletes, or modifies at least one of the objects of the control program followed by a commit transaction command for the group;
(b) preprocessing the plurality of operations wherein, for each operation, the preprocessing includes executing the plurality of operations up to a point before any modification of objects that would affect current execution of the control program, then cease preprocessing until the commit transaction command is received, wherein the preprocessing includes the step of checking that the plurality of operations for the multiple objects are within the capabilities of the industrial controller, wherein checking further includes at least one of the steps of: checking the state of the existing object, and instantiating a pending object;
(c) if any of the plurality of operations is not within the capability of the industrial controller, roll back the steps of preprocessing of the operation of all of the multiple objects to return the industrial controller substantially to a state before the preprocessing of the operations;
(d) only if each of the plurality of operations is within the capability of the industrial controller, complete processing of all of the operations upon receipt of the commit transaction command to change current execution of the control program;
whereby partial modification of the control program objects during execution of the control program is prevented.

24. The computer implemented method of claim 23, further comprising reversing the operations having a pending status responsive to an abort of the transaction prior to receiving the commit transaction command.

25. An industrial controller, comprising:
a memory configured to store an object-oriented application for interfacing with a controlled process, wherein the application includes an object table for storing the state of each object;
a processing device configured to receive a transaction, the transaction including a grouped plurality of operations affecting multiple objects of the object-oriented application, followed by a commit transaction command for the group,
wherein, upon receipt of the transaction and while executing the object-oriented application, the processing device is operable to
(a) preprocess the plurality of operations wherein, for each operation, the preprocessing includes executing the plurality of operations up to a point before any modification of objects that would affect current execution of the control program, then cease preprocessing until the commit transaction command is received, wherein the preprocessing includes the step of checking that the plurality of operations for the multiple objects are within the capabilities of the industrial controller, wherein checking further includes at least one of the steps of: checking the state of the existing object, and instantiating a pending object;
(b) if any of the plurality of operations is not within the capability of the industrial controller, roll back the steps of preprocessing of the operation of all of the multiple objects to return the industrial controller substantially to a state before the preprocessing of the operations;
(c) only if each of the plurality of operations is within the capability of the industrial controller, complete processing of all of the operations upon receipt of the commit transaction command to change current execution of the control program;
whereby partial modification of the control program objects during execution of the control program is prevented.

26. The industrial controller of claim 25, wherein the processing device is configured to reverse the operations associated with the objects having a pending status responsive to an abort of the transaction prior to receiving the commit transaction command.

* * * * *

UNITED STATES PATENT AND TRADEMARK OFFICE
CERTIFICATE OF CORRECTION

| | | |
|---|---|---|
| PATENT NO. | : 8,942,834 B2 | Page 1 of 1 |
| APPLICATION NO. | : 11/167381 | |
| DATED | : January 27, 2015 | |
| INVENTOR(S) | : David A. Johnston | |

It is certified that error appears in the above-identified patent and that said Letters Patent is hereby corrected as shown below:

IN THE CLAIMS

CLAIM 20, Col. 13, Line 17, delete "roll hack the steps of" and substitute therefore -- roll back the steps of --

Signed and Sealed this
Second Day of June, 2015

Michelle K. Lee
*Director of the United States Patent and Trademark Office*